United States Patent
Li et al.

(10) Patent No.: US 11,412,399 B2
(45) Date of Patent: Aug. 9, 2022

(54) SYSTEMS, METHODS, AND DEVICES FOR IMPLEMENTING ANTENNA DIVERSITY WITH WIRELESS COMMUNICATIONS DEVICES

(71) Applicant: Cypress Semiconductor Corporation, San Jose, CA (US)

(72) Inventors: Kaiping Li, Randolph, NJ (US); Kamesh Medapalli, San Jose, CA (US); Jie Lai, Belle Mead, NJ (US); Wenyu Liu, Lake Forest, CA (US); Thaiyalan Appadurai, Lake Forest, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/113,350

(22) Filed: Dec. 7, 2020

(65) Prior Publication Data

US 2021/0185549 A1   Jun. 17, 2021

Related U.S. Application Data

(63) Continuation of application No. 16/573,190, filed on Sep. 17, 2019, now Pat. No. 10,869,212, which is a continuation of application No. 16/227,152, filed on Dec. 20, 2018, now Pat. No. 10,455,442.

(60) Provisional application No. 62/741,387, filed on Oct. 4, 2018.

(51) Int. Cl.
*H04W 24/08* (2009.01)
*H04W 4/80* (2018.01)
*H04B 17/336* (2015.01)
*H04W 72/08* (2009.01)
*H04B 7/02* (2018.01)

(52) U.S. Cl.
CPC .............. *H04W 24/08* (2013.01); *H04B 7/02* (2013.01); *H04B 17/336* (2015.01); *H04W 4/80* (2018.02); *H04W 72/085* (2013.01)

(58) Field of Classification Search
CPC ..... H04W 24/08; H04W 4/80; H04W 72/085; H04B 7/02; H04B 17/336; H04B 7/0802; H04B 7/0608; H04B 17/318
See application file for complete search history.

(56) References Cited

U.S. PATENT DOCUMENTS

| | | | |
|---|---|---|---|
| 10,379,215 B1 * | 8/2019 | Roovers | G01S 5/06 |
| 2005/0286627 A1 | 12/2005 | Tabatabaei | |
| 2008/0248753 A1 | 10/2008 | Chang et al. | |
| 2009/0109926 A1 * | 4/2009 | Meylan | H04W 36/02 370/331 |
| 2009/0129323 A1 * | 5/2009 | Chen | H04W 72/0406 370/329 |

(Continued)

OTHER PUBLICATIONS

Examination Report for CD17066DE dated Jun. 30, 2020; 20 pages.

(Continued)

*Primary Examiner* — Kiet Tang

(57) ABSTRACT

Systems, methods, and apparatus use a processor of a first device to wirelessly communicate with a second device using a first antenna. The processor selects the first antenna from a plurality of antennas based on comparing first antenna data associated with the first antenna with second antenna data associated with a second antenna.

20 Claims, 12 Drawing Sheets

(56) References Cited

U.S. PATENT DOCUMENTS

| | | | |
|---|---|---|---|
| 2010/0085973 A1* | 4/2010 | Li | H04W 72/02 370/395.3 |
| 2013/0029711 A1* | 1/2013 | Kang | H04B 7/0691 455/509 |
| 2013/0089085 A1 | 4/2013 | Ben-Moshe et al. | |
| 2015/0093987 A1* | 4/2015 | Ouyang | H04B 5/0043 455/41.1 |
| 2015/0169916 A1* | 6/2015 | Hill | G06Q 10/08 340/10.1 |
| 2017/0338872 A1* | 11/2017 | Vo | G06Q 10/0833 |
| 2018/0054797 A1 | 2/2018 | Islam et al. | |
| 2018/0110049 A1 | 4/2018 | Xue et al. | |
| 2019/0033420 A1 | 1/2019 | Knaappila | |

OTHER PUBLICATIONS

USPTO Examiner Initiated Interview Summary for U.S. Appl. No. 16/227,152 dated Jun. 12, 2019; 1 page.

USPTO Non-Final Rejection for U.S. Appl. No. 16/227,152 dated Mar. 28, 2019; 17 pages.

USPTO Non-Final Rejection for U.S. Appl. No. 16/573,190 dated on Jul. 10, 2020; 25 pages.

USPTO Notice of Allowance for U.S. Appl. No. 16/227,152 dated Jun. 12, 2019; 10 pages.

USPTO Notice of Allowance for U.S. Appl. No. 16/573,190 dated on Aug. 13, 2020; 9 pages.

* cited by examiner

SYSTEMS, METHODS, AND DEVICES FOR IMPLEMENTING ANTENNA DIVERSITY WITH WIRELESS COMMUNICATIONS DEVICES

CROSS-REFERENCE TO RELATED APPLICATIONS

This application is a Continuation of U.S. patent application Ser. No. 16/573,190, filed on Sep. 17, 2019, which is a continuation of U.S. patent application Ser. No. 16/227,152, filed Dec. 20, 2018, now U.S. Pat. No. 10,455,442, which issued on Oct. 22, 2019, which claims the benefit under 35 U.S.C. § 119(e) of U.S. Provisional Patent Application No. 62/741,387, filed on Oct. 4, 2018, all of which are incorporated by reference herein in their entirety.

TECHNICAL FIELD

This disclosure generally relates to wireless communications devices, and more specifically, to implementation of antenna diversity techniques associated with such wireless communications devices.

BACKGROUND

Various devices may be capable of implementing wireless communications via one or more antennas. Such wireless communications may be implemented using communications modems that include transceivers configured in accordance with one or more transmission protocols, such as a Bluetooth protocol. Accordingly, such devices may be configured to communicate via a communications network in accordance with such protocols. Such devices may include multiple antennas that may be used for transmitting and/or receiving. Accordingly, devices may include antenna arrays. However, to reduce cost and power consumption, as well as the complexity of the modem in the devices, a switched antenna array may be connected to the device is preferred. However, such devices are limited in their ability to identify to which antenna should be used for receiving and/or transmitting data. Moreover, such devices are limited in their ability to effectively transmit and receive data because they are not able to efficiently select which antenna should be used.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Some wireless communications devices are limited in their ability to implement antenna diversity techniques. For example, they may utilize excessive amounts of processing hardware to implement such diversity techniques, as they may require complex radio receivers and complex baseband processing. Such techniques are not compatible with low energy applications and protocols. Accordingly, such techniques cannot be effectively and efficiently implemented in such low energy electronics and devices.

Embodiments disclosed herein provide antenna diversity techniques that may be implemented in low energy devices, and in a manner compatible with low energy protocols, such as Bluetooth and Bluetooth Low Energy. As will be discussed in greater detail below, a designated portion of a handling of a data packet may be used to obtain signals measurements for antennas of a wireless communications device, and such measurements may be used to identify and select a best antenna to use for communication. As will also be discussed in greater detail below, antenna diversity techniques disclosed herein may be compatible with Angle of Arrival (AoA) and Angle of Departure (AoD) calculations such that antenna diversity and AoA or AoD may be implemented concurrently in low energy electronics and devices.

Figure 1:
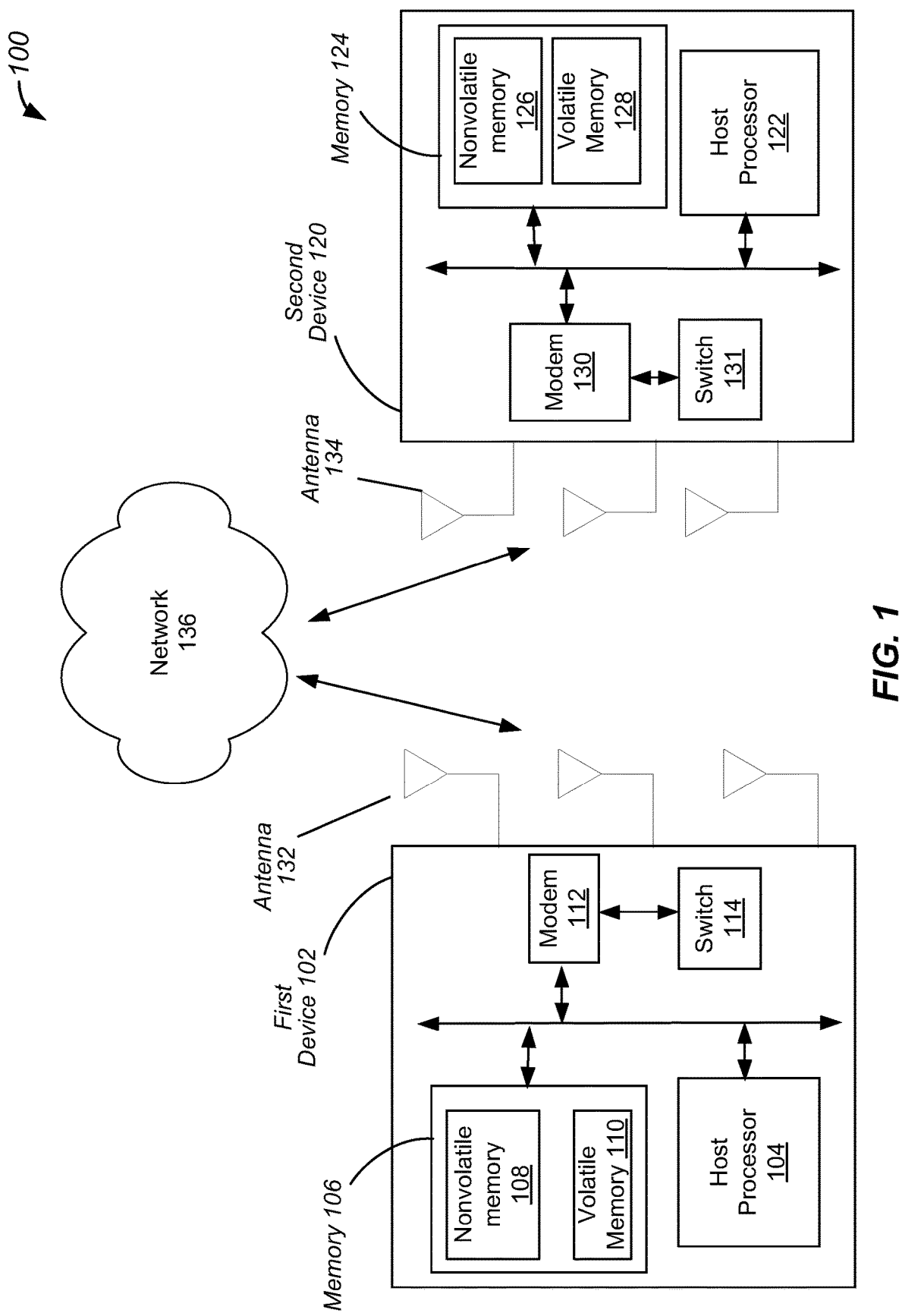
FIG. 1 illustrates an example of a system for implementing an antenna diversity technique, configured in accordance with various embodiments.

FIG. 1 illustrates an example of a system for implementing an antenna diversity technique, configured in accordance with various embodiments. In various embodiments, systems, such as system 100, include various devices, such as first device 102 and second device 120, which may be wireless communications devices. Accordingly, such devices are configured to communicate with each other via one or more wireless transmission protocols via a communications network, such as network 136. As will be discussed in greater detail below, such a wireless transmission protocol may be a Bluetooth protocol or a Bluetooth Low Energy (BLE) protocol. While various embodiments disclosed herein are discussed with reference to Bluetooth and Bluetooth Low Energy specifications, it will be appreciated that any suitable specification and/or protocol may be implemented. For example, systems, devices, and methods disclosed herein may be implemented with Zigbee, LoRa, or any other protocol or specification compatible with low cost communications devices.

Accordingly, first device 102 may include host processor 104, and may also include a memory device, such as memory 106, coupled to host processor 104 as well as other components of first device 102. In various embodiments, memory 106 may include nonvolatile memory 108 and volatile memory 110. In some embodiments, host processor 104 and memory 106 may be implemented as a single component on a single chip. Accordingly, while FIG. 1 illustrates one example of host processor 104 and memory 106, various different configurations are contemplated and disclosed herein. First device 102 may further include multiple antennas, such as antenna 132, which are configured to transmit and receive signals from first device 102 in accordance with the transmission protocols noted above.

In various embodiments, first device 102 may include multiple antennas and may be configured to implement AoA and AoD calculations, such as those that may be implemented during spatial location determination techniques. For example, first device 102 may be configured to acquire IQ samples of signals received at each of its antennas. First device 102 may be further configured to calculate the AoA based on a difference in phase of the acquired samples. Similarly, first device 102 may be configured to transmit a signal from each of its antennas, and another device, such as second device 120, may be configured to receive the signals and determine the AoD based on a difference in phase. Accordingly, first device 102 includes antennas such as antenna 132 and is configured to determine a direction of propagation of a radio-frequency (RF) wave arriving at the antennas, as well as communicate with other devices to determine a direction of propagation of RF waves departing the antennas.

As will be discussed in greater detail below, first device 102 and second device 120 may be further configured to implement various antenna diversity techniques disclosed herein to identify and select a particular antenna for transmission and/or reception of a data packet or frame. For example, first device 102 may be configured to cycle through its antennas to determine a best antenna to use for communication with another device, such as second device 120. In some embodiments, first device 102 is configured to test a signal strength and/or signal quality for each of its antennas during handling of a particular or designated period of data transmission. Accordingly, the signal measurements disclosed herein may be made during the handling and processing operations corresponding to a particular portion of a data packet.

For example, when first device 102 is configured as a Bluetooth or BLE device, first device 102 may test a signal strength for each of its antennas during a continuous tone extension (CTE) period, which may also be referred to herein as a supplemental period. As will be discussed in greater detail below, various information, such as a connection link identifier and a frequency channel number, may be retrieved and stored to identify and select an appropriate antenna based on one or more signal parameters. In this way, first device 102 is configured to utilize a designated portion of data transmission, which may be a portion of the transmission of a data packet or frame, to implement antenna diversity techniques disclosed herein and discussed in greater detail below. It will be appreciated that the antenna diversity techniques disclosed herein may be implemented concurrently with the previously described AoA and AoD calculations. In this way, the signals transmitted during the CTE period may be utilized for both AoA or AoD, and antenna diversity purposes.

As noted above, system 100 further includes second device 120 which includes host processor 122, and also includes memory 124 coupled to host processor 120 as well as other components of second device 120. In various embodiments, memory 124 may include nonvolatile memory 126 and volatile memory 128. Second device 120 may further include multiple antennas, such as antenna 134, which are configured to transmit and receive signals from second device 120 in accordance with the transmission protocols noted above. As similarly discussed above, second device 120 may include multiple antennas and may be configured to implement Angle of Arrival (AoA) and Angle of Departure (AoD) calculations, such as those that may be implemented during spatial location determination techniques. As also noted above, and will be discussed in further detail below, second device 120 may be further configured to implement various antenna diversity techniques disclosed herein to identify and select a particular antenna for transmission and/or reception of a data packet or frame. For example, second device 120 may be configured to cycle through its antennas to determine a best antenna to use for receiving data from another device, such as first device 102.

Figure 2:
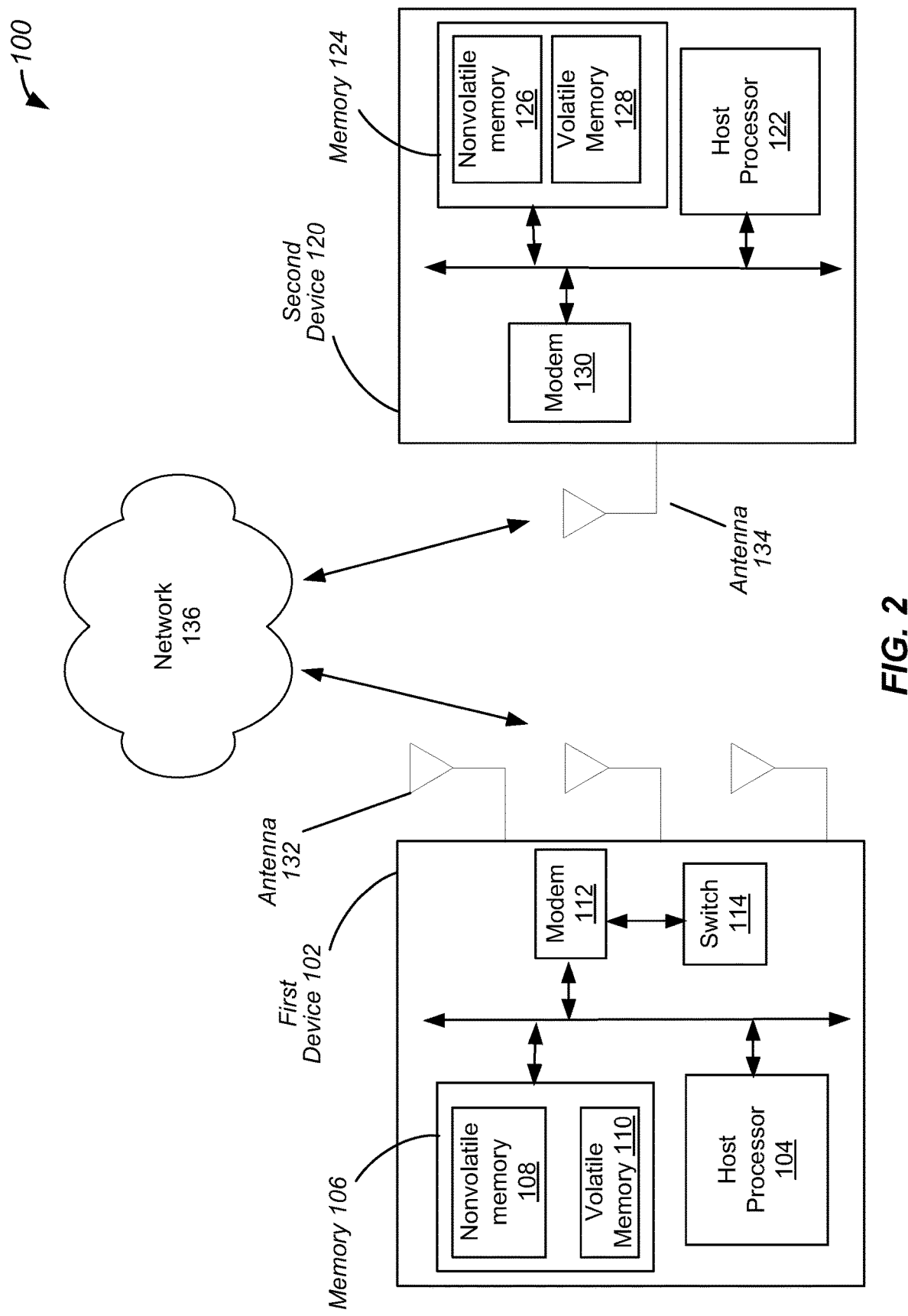
FIG. 2 illustrates another example of a system for implementing an antenna diversity technique, configured in accordance with various embodiments.

FIG. 2 illustrates another example of a system for implementing an antenna diversity technique, configured in accordance with various embodiments. As discussed above, system 100 may include first device 102 and second device 120 which may communicate via network 136. As also discussed above, first device 102 may include host processor 104 and memory 106 which may include nonvolatile memory 108 and volatile memory 110. First device 102 may further include modem 112, switch 114, as well as antennas such as antenna 132. Moreover, second device 120 may include host processor 122 and memory 124 which may include nonvolatile memory 126 and volatile memory 128. Second device 120 may further include modem 130 and antenna 134.

As shown in FIG. 2, first device 102 has multiple antennas and second device 120 has a single antenna. Accordingly, as will be discussed in greater detail below, first device 102 may be configured to cycle through each of the antennas to test a signal strength with antenna 134 of second device 120. Such determination of signal strength may be implemented during a designated period of transmission of data, such as a CTE period. As will also be discussed in greater detail below, different antennas of first device 102 may be used to transmit test data or signals, such as a continuous tone, from first device 102 to second device 120, and a signal strength may be measured for each antenna. Moreover, additional information may be stored as well, such as a connection link identifier and a frequency channel identifier, and such additional information may be used to index and store the measured data. In various embodiments, second device 120 is configured to return the results to first device 102, and first device 102 is configured to select a particular antenna based on the results. Accordingly, the selected antenna may be used to transmit the next data packet or frame.

Figure 3:
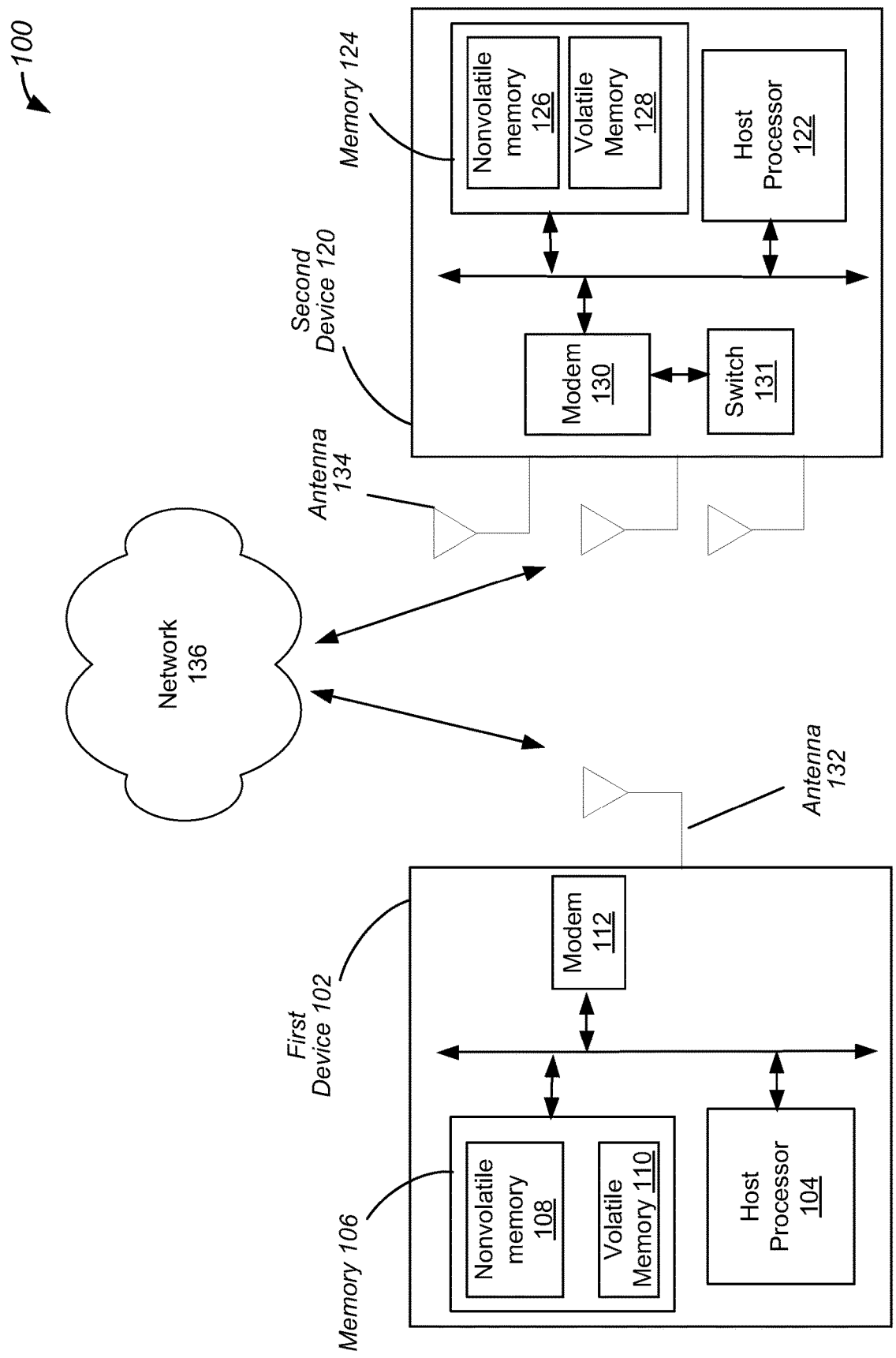
FIG. 3 illustrates yet another example of a system for implementing an antenna diversity technique, configured in accordance with various embodiments.

FIG. 3 illustrates yet another example of a system for implementing an antenna diversity technique, configured in accordance with various embodiments. As discussed above, system 100 may include first device 102 and second device 120 which may communicate via network 136. As also discussed above, first device 102 may include host processor 104 and memory 106 which may include nonvolatile memory 108 and volatile memory 110. First device 102 may further include modem 112 and antenna 132. Moreover, second device 120 may include host processor 122 and memory 124 which may include nonvolatile memory 126 and volatile memory 128. Second device 120 may further include modem 130, switch 131, as well as antennas such as and antenna 134.

As shown in FIG. 3, second device 120 has multiple antennas and first device 102 has a single antenna. In this example, as will be discussed in greater detail below, second device 120 is configured to cycle through each of the antennas to test a signal strength with antenna 132 of second device 120. As noted above, such determination of signal strength may be implemented during a designated period of transmission of data, such as a CTE period. Accordingly, in this example, antenna 132 of first device 102 may be used to transmit data to second device 120, and second device 120 is configured to cycle through its antennas to receive the data at each of its antennas. Accordingly, a signal strength may be measured for each antenna, as well as additional information such as a connection link identifier and a frequency channel identifier. In various embodiments, second device 120 is configured to select a particular antenna based on the results, and the selected antenna may be used to receive the next data packet or frame transmitted by first device 102.

Figure 4:
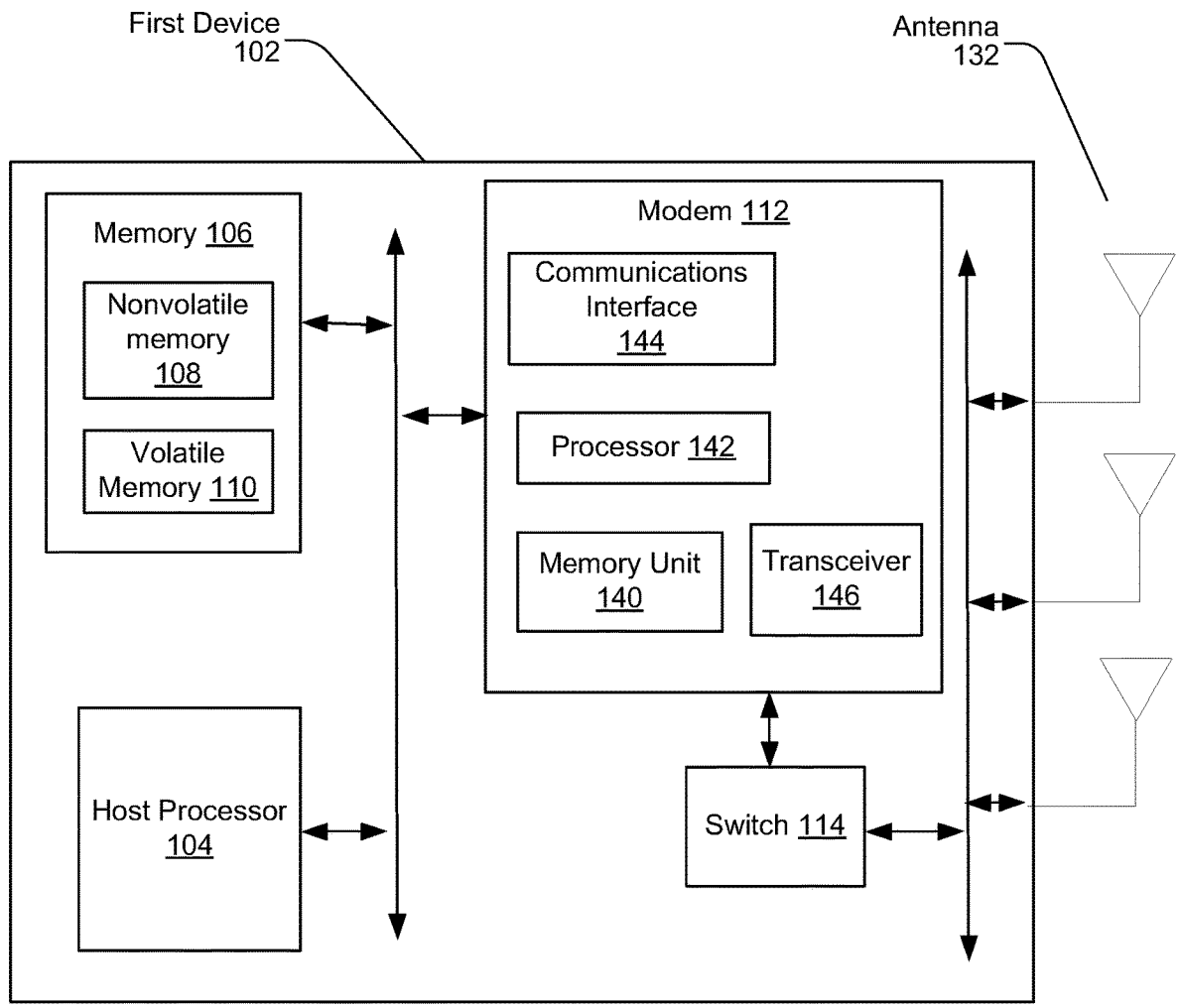
FIG. 4 illustrates an example of a device for implementing an antenna diversity technique, configured in accordance with various embodiments.

FIG. 4 illustrates an example of a device for implementing an antenna diversity technique, configured in accordance with various embodiments. As discussed above, first device 102 may include host processor 104 and memory 106 which may include nonvolatile memory 108 and volatile memory 110. First device 102 may further include modem 112, switch 114, and antennas such as antenna 132. Accordingly, switch 114 is configured to selectively couple and decouple antennas such as antenna 132 to other components of first device 102, such as modem 112.

In various embodiments, modem 112 includes various components such as communications interface 144 which is configured to manage communications with other components, such as memory 106 and host processor 104. Modem 112 further includes processor 142 and memory unit 140 which are configured to implement processing operations associated with the transmission and reception of data in accordance with one or more transmission protocols, such as Bluetooth and BLE. In various embodiments, processor 142 and memory unit 140 are further configured to implement the antenna diversity operations discussed above and in greater detail below. More specifically, processor 142 may be configured to handle the selection of different antennas during antenna diversity operations, store antenna diversity data in memory unit 140, as well as select a particular antenna to be used for transmission or reception of a next data packet or frame. In some embodiments, processor 142 may also be configured to store such data in memory 106.

As will be discussed in greater detail below, antenna diversity data may include various entries for each antenna, and the data entries may include various values for various parameters. For example, such antenna diversity data entries may include antenna identifiers, signal measurements, connection link identifiers, as well as the frequency channel identifiers. Accordingly, the antenna diversity data may be indexed based on the connection link identifier and the frequency channel identifier such that they are indexed and organized based on an antenna identifier, a connection link identifier, and a frequency channel identifier. Moreover, the antenna diversity data may include various other entries for other parameters as well. For example, the antenna diversity data may also include a status identifier for each antenna. In some embodiments, the status identifier may identify one or more operational parameters of the antenna, and may further identify a status associated with such operational parameters. In one example, a status identifier may identify a status of an antenna's connectivity or gains. Accordingly, the status identifier may identify a "low gain" status, a "broken" status, or a "connection loss" status. In some embodiments, a component, such as processor 142, may be configured to generate such status identifiers based on previous signal measurements. Accordingly, if one or more conditions is measured and observed, processor 142 may generate the appropriate status identifier. In one example, if a particular antenna consistently has signal measurements with a signal strength or signal quality below a designated threshold, or a beyond a designated amount below an average of all antennas, the antenna may be assigned a status of "low gain". Accordingly, such status identifiers may be generated and used for antenna selection, deselection, exclusion, and/or removal from a pool, as will be discussed in greater detail below.

In various embodiments, modem 112 further includes transceiver 146 which is configured to transmit and/or receive data using antennas such as antenna 132. Accordingly, transceiver 146 may include a modulator and demodulator configured to modulate and demodulate data packets in accordance with transmission protocols disclosed herein, and such data may be transmitted and/or received via antennas such as antenna 132. While FIG. 4 illustrates additional features of first device 102 and modem 112, it will be appreciated that such additional features may be included in second device 120 as well as modem 130. Furthermore, while FIG. 4 illustrates one example of first device 102, it will be appreciated that first device 102 as well as other devices described herein may be implemented with multiple radios and multiple modems implemented for different transmission protocols. Accordingly, signal measurements may be taken by multiple modems, and a best antenna may be selected based on a combination of such measurements. Moreover, multiple types of measurements may be used to select antennas. For example, a combination of measures of signal strength as well as signal quality may be used. More specifically, an average of measures may be used for each antenna if multiple measurements are available from previous iterations of antenna diversity operations. Moreover, the combination of the measures may be weighted. For example, a measure of signal strength may have a higher weight than signal quality for some communications links, and may have a lower weight than signal quality for other communications links.

Further still, various components of first device 102 may be implemented on one or more integrated circuit chips. For example, components of first device 102 may be implemented on a single integrated chip. In another example, components of modem 112 may be implemented on a single integrated chip that is coupled to other components of first device 102. In various embodiments, such integrated circuit chips may be monolithic chips. Moreover, such chips may be compatible with and configured to implement Bluetooth Low Energy specifications and requirements. Furthermore, while FIG. 4 illustrates processor 142 implemented within modem 112, it will be appreciated that processor 142 may be implemented separately from modem 112.

Figure 5:
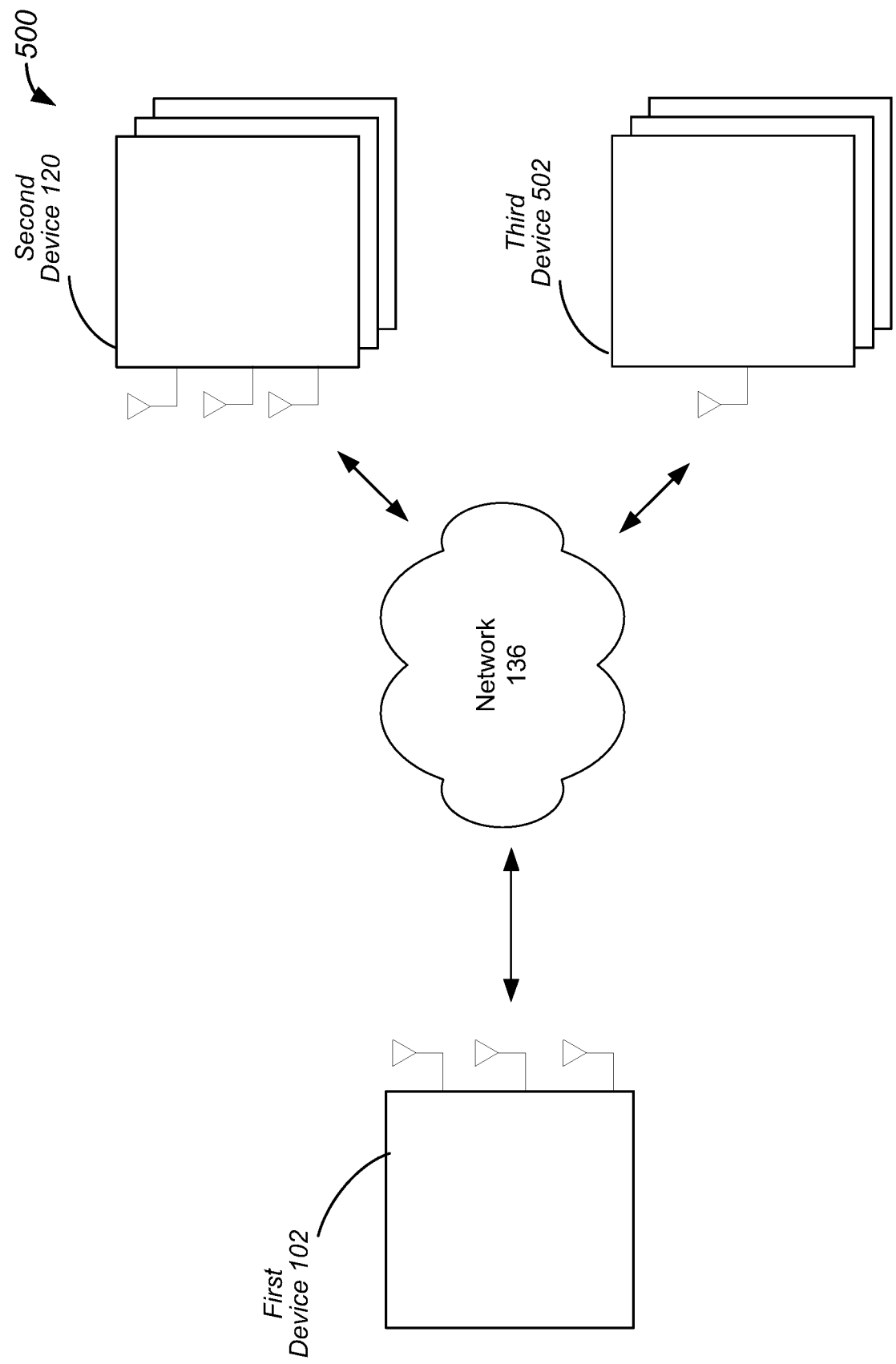
FIG. 5 illustrates another example of a system for implementing an antenna diversity technique, configured in accordance with various embodiments.

FIG. 5 illustrates another example of a system for implementing an antenna diversity technique, configured in accordance with various embodiments. As noted above, a system may include various devices, such as first device 102 and second device 120. As shown in FIG. 5, system 500 may be configured to include multiple devices in communication with each other via a network, such as network 136. Accordingly, first device 102 may be configured to communicate with second device 120 as well as third device 502. In this example, first device 102 is configured to implement antenna diversity operations disclosed herein with reference to second device 120 as well as third device 502. For example, first device 102 is configured to select a first antenna for communication with second device 120 based on antenna diversity operations performed with second device 120. Moreover, first device 102 is configured to select a second antenna for communication with third device 502 based on antenna diversity operations performed with third device 502. In various embodiments, the antenna diversity operations performed are implemented during the same CTE period such that multiple determinations are made during a single CTE period. In this example, the first antenna may then be used to transmit a next data packet or frame to second device 120, and the second antenna may then be used to transmit a next data packet or frame to third device 502. Details of the antenna diversity operations are discussed in greater detail below.

Figure 6:
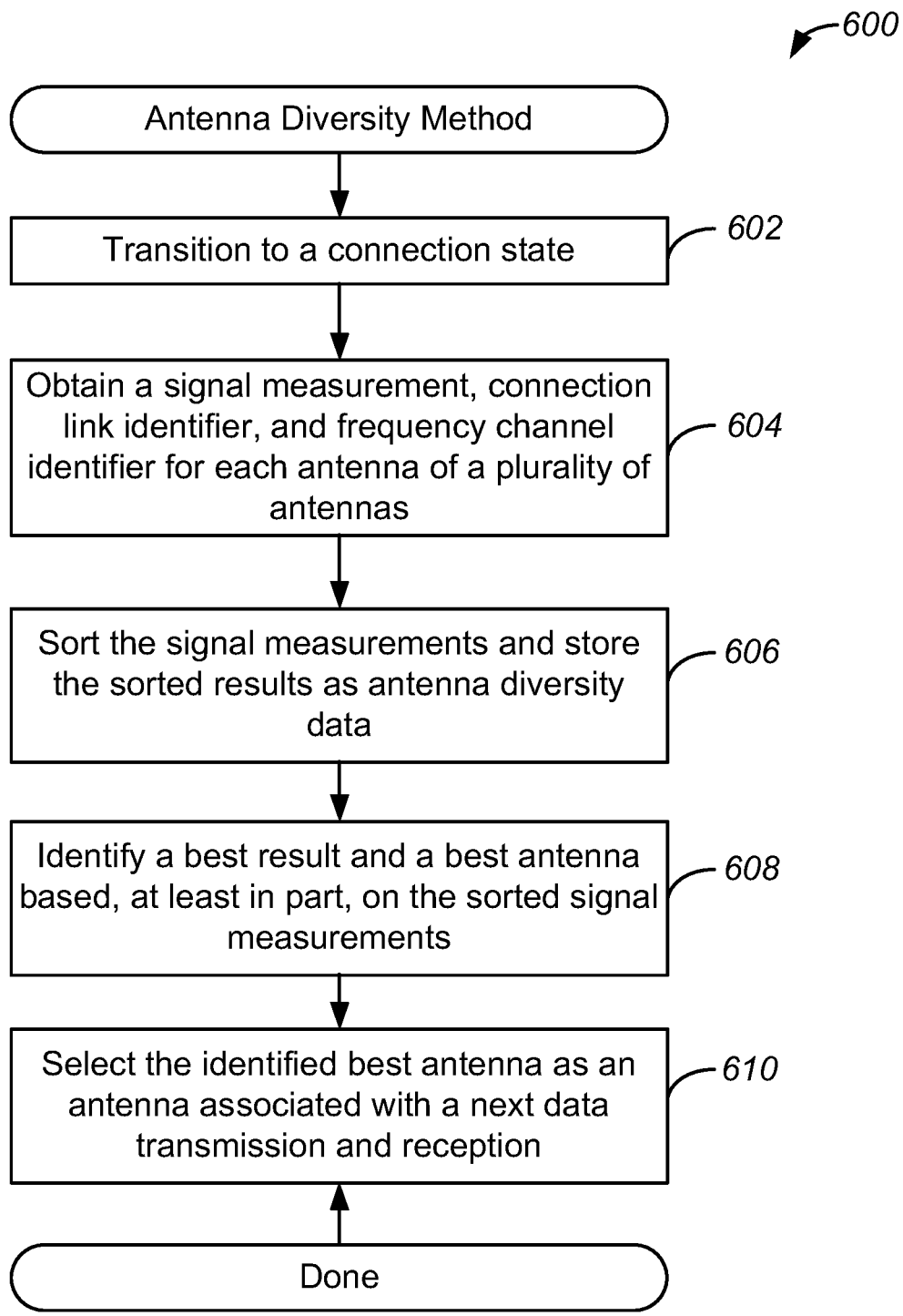
FIG. 6 illustrates an example of a method for an antenna diversity technique, implemented in accordance with various embodiments.

FIG. 6 illustrates an example of a method for an antenna diversity technique, implemented in accordance with various embodiments. As discussed above, devices disclosed herein may be configured to implement various AoA as well as AoD determinations. Furthermore, such devices may be configured to implement antenna diversity techniques to identify and select a particular antenna for transmission and/or reception of data to and from the device. Accordingly, signal strengths and/or signal qualities may be tested and measured for various different combinations of connection links and frequency channels, and a particular antenna may be selected based on such measurements.

Accordingly, method 600 may commence with operation 602 during which a connection state may be transitioned to. In various embodiments, devices that include antennas, as described above, may be in an "advertising state" in which data is broadcast from a device to any other device that is in range. Accordingly, during such a state, there might not be an established communications link until another device responds to the broadcast. Accordingly, during operation 602, a communications link may be established, and a device may transition from an advertising state to a connection state. During the transition to the connection state, various connection information may be stored, such as device identifiers and a connection link identifier.

Method 600 may proceed to operation 604 during which a signal measurement may be acquired for each antenna of a wireless communications device. As noted above, such a device may include multiple antennas, which may be implemented as an array of antennas, and a signal measurement may be acquired for each antenna. In one example, the measurements may be made based on data transmitted from another device, and the measurements may be made during a CTE period of data transmission. Accordingly, a signal measurement may be made for each antenna used to receive such transmitted data. In various embodiments, each antenna has a particular beam shape or form, as may be determined based on a variety of parameters, such as orientation. Accordingly, the measurements may be used identify a quality of a beam for each antenna so that the antenna with the best beam may be selected. More specifically, the signal measurement may be a measurement of signal strength, such as a received signal strength indicator (RSSI) measurement. In various embodiments, the signal measurement may be a measurement of signal quality, such as a signal-to-interference-plus-noise ratio (SINR) measurement. In various embodiments, an antenna identifier may also be stored for each signal measurement to identify the antenna that was used to make the measurement.

In various embodiments, additional data may be identified and stored as well. For example, a connection link identifier may be identified, where such a connection link identifier is configured to identify devices associated with the connection being tested. In one example, the devices may be first device 102 and second device 120 discussed above. Accordingly, an identifier associated with the connection link under test may be retrieved and/or generated. Moreover, a frequency channel identifier may also be identified and stored. In various embodiments, the frequency channel identifier is configured to identify a frequency or frequency band that is being tested. In various embodiments, devices are configured to implement frequency hopping in which multiple frequencies or frequency bands are cycled through as specified by a communications protocol. Thus, paired devices in a communication link may cycle through frequency bands, and antenna diversity data may be stored and utilized for each frequency band. Accordingly, the signal measurement, the connection link identifier, as well as the frequency channel identifier may be stored as antenna diversity data. In some embodiments, the antenna diversity data may be indexed based on the connection link identifier and the frequency channel identifier. In this way, signal measurements may be stored in a manner that is indexed and organized based on a connection link identifier and a frequency channel identifier. As noted above, the antenna diversity data may store such data for multiple connection links with multiple devices.

Method 600 may proceed to operation 606 during which the signal measurements may be sorted based on one or more signal parameters. For example, if the signal measurements are SINR measurements, they may be sorted in ascending or descending order and stored again in the antenna diversity data. In some embodiments, the signal measurements may also be filtered. For example, measurements under a designated threshold value may be discarded. In this way, the measurement data including the signal measurements may be sorted such that they are ordered based on a signal strength or signal quality. In various embodiments, additional operations may be implemented as well. For example, if there are multiple measurements for a particular antenna for a particular connection link and frequency channel, those measurements may be combined and/or averaged to obtain a single result that is stored as antenna diversity data.

Method 600 may proceed to operation 608 during which a best result and a best antenna may be identified. Thus, according to various embodiments, a best result may be identified based on the sorted measurements. For example, if the signal measurements are SINR measurements, once sorted, the diversity data entry having the highest or largest SINR measurement may be selected. Accordingly, a highest signal quality measurement or a highest signal strength measurement may be used to identify an antenna. Furthermore, the antenna identifier stored with the signal measurement may be used to identify a best antenna. According to some embodiments, the antenna may be selected based on comparisons of the signal measurements with designated thresholds. Accordingly, signal measurements may be compared to threshold values that may have been set by a manufacturer or a user, and an antenna may be selected based on the comparison. Accordingly, as disclosed herein, the description of a best antenna may refer to an antenna selected using any of the previously mentioned techniques.

In various embodiments, other antenna information can also be utilized to identify and select a best antenna, such as an antenna connection condition, a channel fading condition, as well as any other suitable channel information or data.

Method 600 may proceed to operation 610 during which the identified antenna may be utilized for subsequent data communication. In an example where the device is receiving data, the identified antenna may be used to receive the next data packet or frame. In another example where the device is transmitting data, the identified antenna may be used to transmit the next data packet or frame. Furthermore, if the device transitions back to an advertising state, the identified antenna may be used for broadcasting during the advertising state. In this way, antenna diversity data used to select a particular antenna may be leveraged and used to enhance communications implemented in a connection state, as well as an advertising state. It will be appreciated that additional iterations of method 600, as well as the additional methods described below, may be implemented for subsequent transmissions of subsequent data packets. Accordingly, the best antenna is continually selected despite changing conditions, such as movement of the device as well as changes in a frequency band as may occur during frequency hopping. Additional details regarding the selection of antennas and implementations of antenna diversity techniques are discussed in greater detail with reference to FIGS. 7-11 below.

Figure 7:
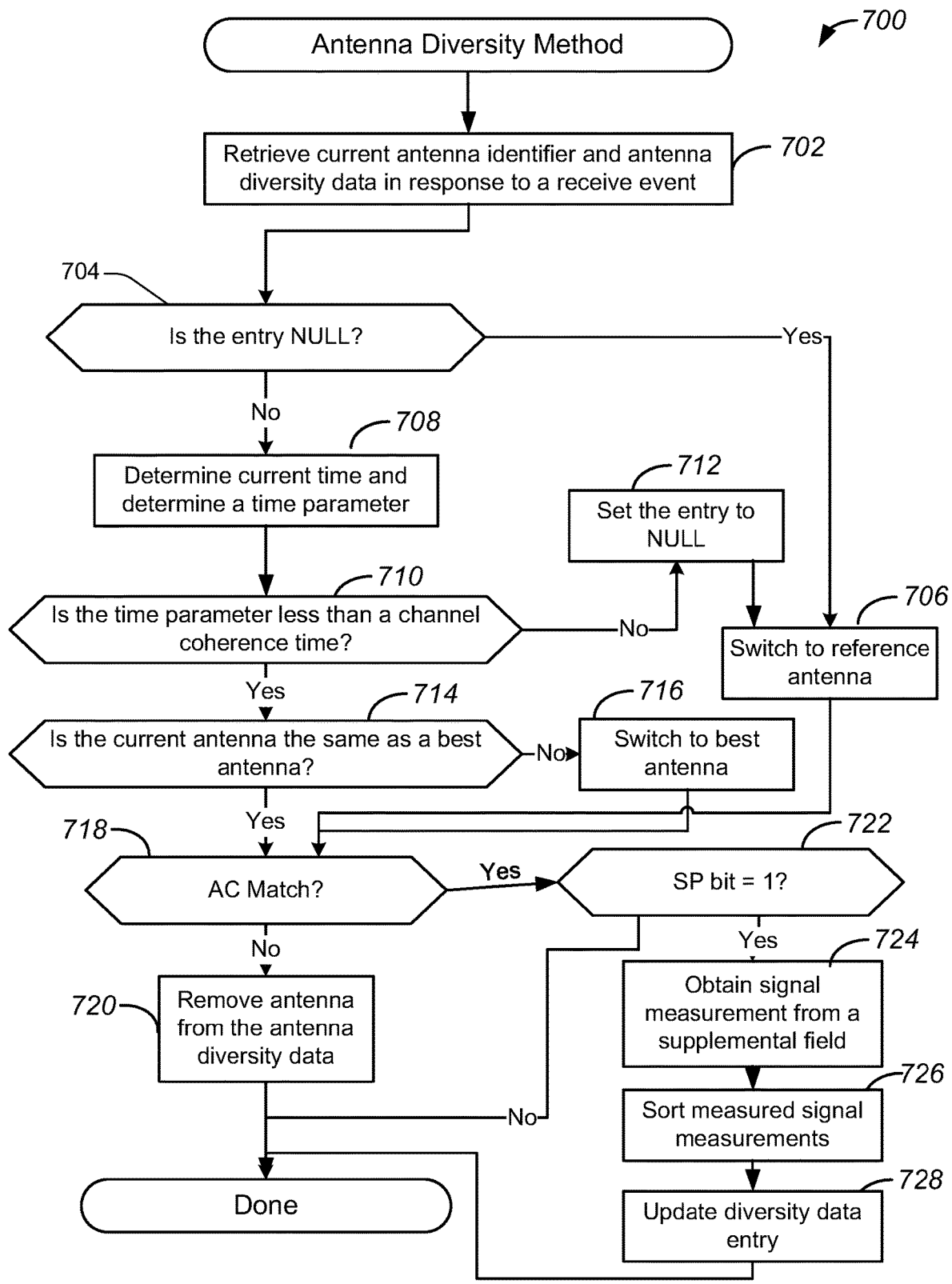
FIG. 7 illustrates another example of a method for an antenna diversity technique, implemented in accordance with various embodiments.

FIG. 7 illustrates another example of a method for an antenna diversity technique, implemented in accordance with various embodiments. As discussed above, devices disclosed herein may be configured to implement antenna diversity techniques to identify and select a particular antenna for transmission and/or reception of data to and from the device. As will be discussed in greater detail below, such techniques may be used to handle antenna diversity operations for multiple connection links with multiple devices and in accordance with various transmission protocols, and the discussion below further describes how such techniques may be used for receive events.

Accordingly, method 700 may commence with operation 702 during which a current antenna identifier and antenna diversity data may be retrieved in response to a receive event being identified. Accordingly, a receive event may be identified indicating that data is to be received at a wireless communications device. In various embodiments, the receive event may be identified based, at least in part, on a timer that is triggered in the modem. Accordingly, the timing of the receive event may be scheduled in accordance with a communications protocol, and may, in some embodiments, be triggered based on an initial data value received. Moreover, in some embodiments, the retrieving of the current antenna identifier and antenna diversity data may occur after a transition from an advertising state to a connection state. In response to identifying the receive event, a current antenna may be identified, and antenna diversity data may be queried. In some embodiments, the query may be implemented based on a connection link identifier as well as a frequency channel identifier, and the current antenna identifier may be retrieved from memory based on previously stored data associated with a last transmission or reception operation. In various embodiments, the antenna diversity data may also store other antenna information as well. For example, such additional antenna information may include status identifiers that have been generated by modems described above. Such status identifiers may identify statuses such as a broken or problematic antenna, and such identifications may be made based on an observed degradation in gain, or consistently poor signal strength and/or quality measurements.

Moreover, according to some embodiments, an antenna position may also be determined based on available geolocation data or any other suitable source. For example, the wireless communications device may have geolocation hardware and software configured to provide a location of the wireless communications device and the antenna when a measurement is made. Such a location may be identified and retrieved as an antenna position. In some embodiments, the wireless communications device may be configured to be communicatively coupled to other system components that may have such geolocation hardware and software, as may be the case in a car or vehicle. Moreover, in some embodiments, the current antenna information may also refer to an identified orientation of the antenna, such as a direction the antenna was last facing. Such directions may be cardinal directions, such as north south, east, and west, or may be represented as numerical bearings.

Method 700 may proceed to operation 704 during which it may be determined if the data entry in the antenna diversity data is NULL. In some embodiments, there might not be existing antenna diversity data, and the entry might be NULL. For example, as part of an initialization process of the wireless communications device, all entries may have been set to NULL. If the entry is NULL, method 700 may proceed to operation 706 during which a reference antenna may be identified and selected. Accordingly, the reference antenna may be a predetermined antenna that may be used as a default antenna. If the entry is not NULL, method 700 may proceed to operation 708.

Accordingly, during operation 708, a current time and a time parameter may be identified. Accordingly, a current time may be determined from any suitable source within the wireless communications device. For example, the current time may be determined based on time stamp data received from a time stamp unit or from a system clock. Moreover, a time parameter may be determined based on a difference between the current time and a time when the antenna diversity data entry was generated, as may be identified by a time stamp generated and stored with the antenna diversity data entry.

Method 700 may proceed to operation 710 during which it may be determined if the time parameter is less than a channel coherence time. Accordingly, a channel coherence time may be determined based on a frequency and bandwidth of the frequency channel that is being used. In various embodiments, the channel coherence time may also be determined based on a movement speed of the antenna and the wireless communications device. The time parameter may be compared with the channel coherence time to determine if it is less than or greater than the channel coherence time. In various embodiments, implementing such a comparison ensures that the antenna diversity data that is being used is not too old and is still accurate. If the time parameter is greater than the channel coherence time, method 700 may proceed to operation 712 where the entry is set to NULL, and method 700 may proceed to operation 706. If the time parameter is less than a channel coherence time, than method 700 may proceed to operation 714 which is discussed in greater detail below.

In various embodiments, operations 708 and 710 may be implemented optionally, and/or in response to one or more other conditions or parameters. For example, operations 708 and 710 may be implemented in response to identifying a speed of the wireless communications device is greater than a designated threshold, or in response to identifying one or more applications has been executed on the wireless communications device, or with a computer system coupled to the wireless communications device. For example, if the wireless communications device is implemented in a car, and such parameter data may be retrieved from a computer system of the car which may have access to speed information as well as the execution of an application, such as a navigation application.

Method 700 may proceed to operation 714 during which it may be determined if the current antenna is the same as a best antenna. As noted above, the current antenna may be determined based on an antenna used with the above described receive event. The best antenna may be determined based on the available antenna diversity data. If it is determined that the current antenna is not the same as the best antenna, method 700 may proceed to operation 716 where the best antenna is selected. If it is determined that the current antenna is the best antenna, method 700 may proceed to operation 718.

During operation 718, it may be determined if there is an AC match. In various embodiments, the determination of whether or not there is an AC match may be implemented in response to an AC comparison event, and may be determined based on a comparison of address codes. Accordingly, an access address code (AC) included in the data packet may be compared with an access address code of the device that includes the antennas to ensure that the data packet is intended for the device. If it is determined that there isn't an AC match, method 700 may proceed to operation 720 during which the selected antenna may be removed from the antenna diversity data entry. If it is determined that there is an AC match, method 700 may proceed to operation 722. As similarly discussed above, such removal of the antenna from the antenna diversity data entry may also be applied to operations performed in an advertising state as well thus enhancing antenna selection for the advertising state.

During operation 722, it may be determined if a CP (CTE info present) or called SP (supplemental present) bit has a value of "1". In various embodiments, such a determination may be made based on one or more data values included in a header of the received data packet. If it is determined that the SP bit does not have a value of "1", method 700 may terminate. If it is determined that the SP bit has a value of "1", method 700 may proceed to operation 724.

During operation 724, a signal measurement may be retrieved from a CTE field of the received data packet. As noted above, the signal measurement may be a RSSI or SINR. Moreover, during operation 726, the signal measurements may be sorted as described above, and during operation 728, the sorted signal measurements may be stored as antenna diversity data.

As similarly discussed above, it will be appreciated that additional iterations of method 700, as well as the methods 800, 900, 1000, and 1100 described below, may be implemented for subsequent transmissions of subsequent data packets. Accordingly, the best antenna is continually selected despite changing conditions, such as movement of the device as well as changes in a frequency band as may occur during frequency hopping.

Figure 8:
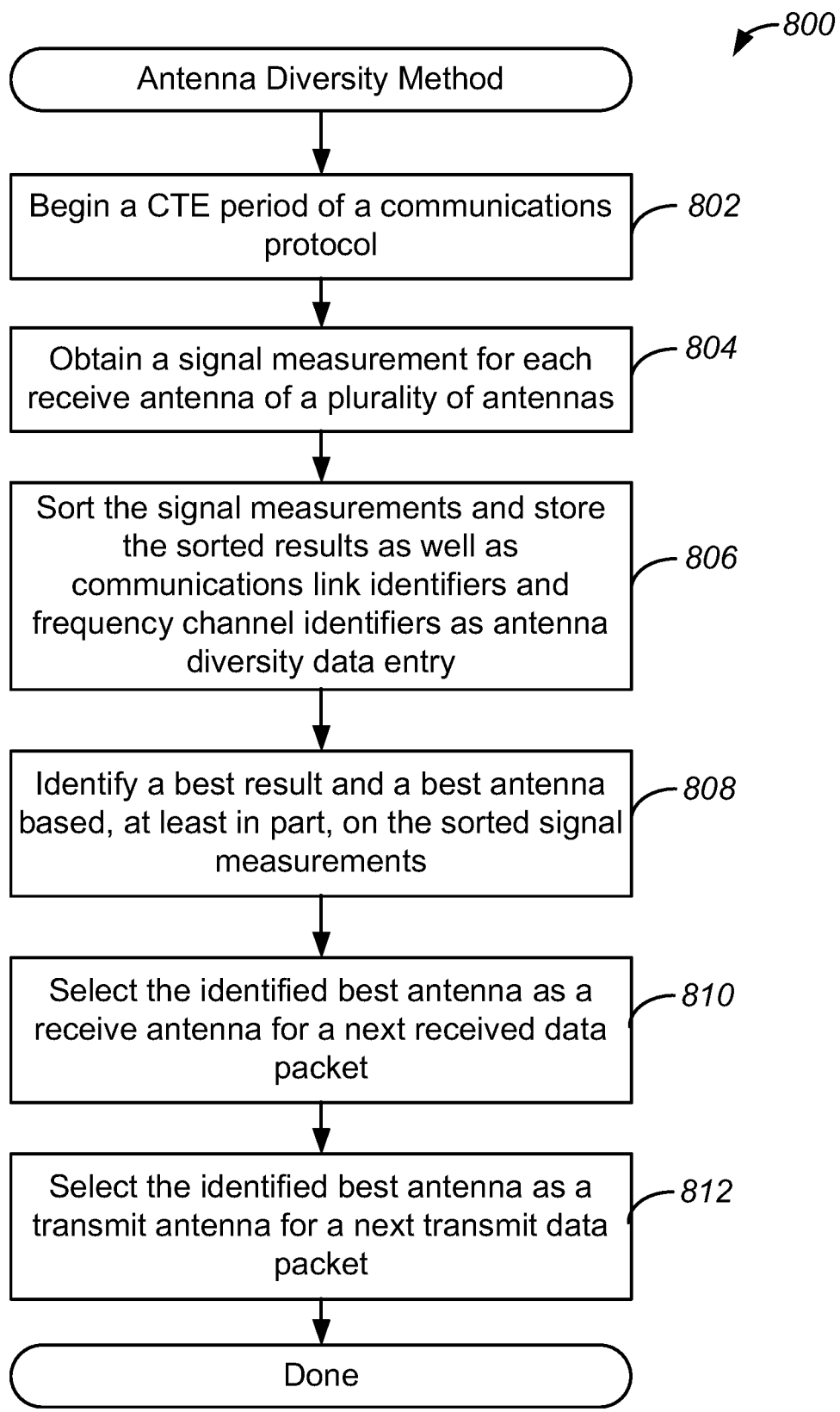
FIG. 8 illustrates yet another example of a method for an antenna diversity technique, implemented in accordance with various embodiments.

FIG. 8 illustrates yet another example of a method for an antenna diversity technique, implemented in accordance with various embodiments. As noted above, devices with multiple antennas disclosed herein may be configured to implement antenna diversity techniques to identify and select a particular antenna for transmission and/or reception of data to and from the device. Accordingly, signal strengths and/or signal qualities may be tested and measured for various different combinations of connection links and frequency channels, and a particular antenna may be selected based on such measurements.

Accordingly, method 800 may commence with operation 802 during which a CTE period of a transmission protocol may begin. As noted above, such a period may occur during a designated portion of a transmission and reception of a data packet which may be a Bluetooth Low Energy data packet. Thus, according to various embodiments, a Bluetooth Low Energy data packet may be received, and a CTE period may begin.

Method 800 may proceed to operation 804 during which a signal measurement may be taken for each antenna of a wireless communications device. In various embodiments, such signal measurements may be implemented in addition to AoA operations and calculations during a CTE period. Accordingly, the wireless communications device that is receiving the data packet may cycle through its antennas and measure a signal strength for each of its antennas as the other device transmits signals in a manner consistent with the communications protocol being used. Accordingly, it will be appreciated that the wireless communications device that is transmitting the data packet is configured to transmit test data or signals for each antenna measurement during the CTE period. In various embodiments, the signals may be a continuous tone that is transmitted throughout the CTE period. As noted above, the signal measurement may be a measure of signal strength and/or quality, as may be represented by RSSI and SINR measurements. Moreover, additional data may be captured as well for each measurement, such as a communications link identifier, a frequency channel identifier, a time stamp, as well as antenna position data.

Method 800 may proceed to operation 806 during which the signal measurements may be sorted. As noted above, the signal measurements may be indexed based on channel link identifiers and frequency channel identifiers, and may be sorted based on the signal measurements. The sorted results may be stored as antenna diversity data.

Method 800 may proceed to operation 808 during which a best antenna may be identified. Accordingly, an antenna with a best signal measurement, such as a greatest signal strength or signal quality, may be identified based on the sorted results. As discussed above with reference to FIG. 7, additional data associated with the antennas, such as position data and time data, may also be retrieved and used to identify the best antenna.

Method 800 may proceed to operation 810 during which the best antenna may be selected as a receive antenna for a next received data packet. Accordingly, the antenna identified during operation 808 may be used as the receive antenna for a next receive event for a next data packet received at the wireless communications device.

Moreover, in some embodiments, method 800 may proceed to operation 812 during which during which the best antenna may be selected as a transmit antenna for a next transmitted data packet. Accordingly, if the next event is a transmit event in which the wireless communications device will transmit instead of receive a data packet, the identified antenna may be used for a next transmit event for a next data packet transmitted by the wireless communications device.

Figure 9:
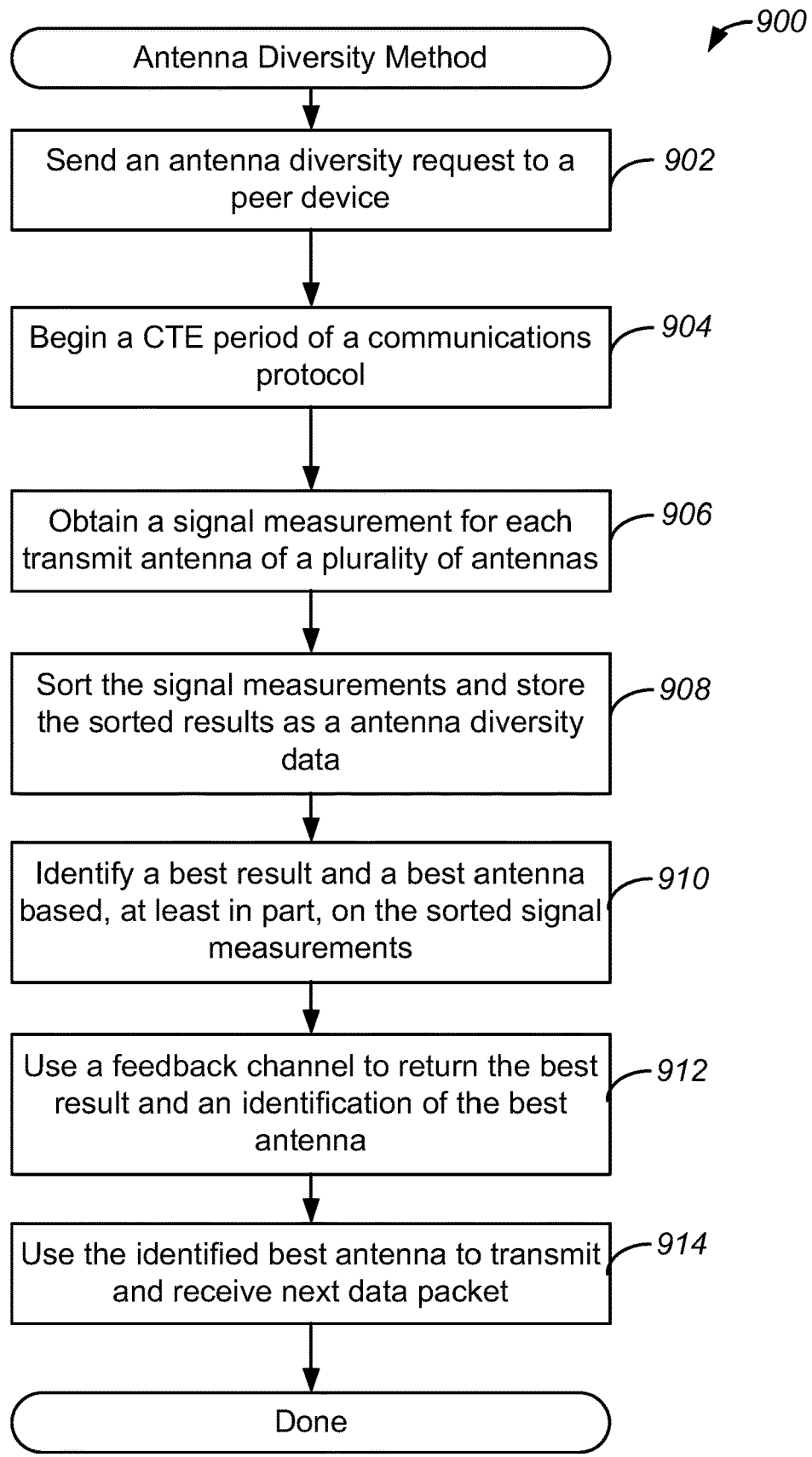
FIG. 9 illustrates an additional example of a method for an antenna diversity technique, implemented in accordance with various embodiments.

FIG. 9 illustrates an additional example of a method for an antenna diversity technique, implemented in accordance with various embodiments. As noted above, devices disclosed herein may be configured to implement antenna diversity techniques to identify and select a particular antenna for transmission and/or reception of data to and from the device. As will be discussed in greater detail below, such methods may be implemented where a first wireless communications device used to transmit and receive data has multiple antennas, a second wireless communications device receiving and transmitting the data has a single antenna, and antenna diversity techniques disclosed herein are used to identify and select a best transmit and receive antenna in, for example, a first device.

Accordingly, method 900 may commence with operation 902 during which an antenna diversity request may be sent to a peer device. Accordingly, a first wireless communications device may send an antenna diversity request to a peer device, such as a second wireless communications device. In various embodiments, the antenna diversity request is configured to ready the second wireless communications device to implement at least some of the antenna diversity operations described below, and synchronize the implementation of such operations. In various embodiments, the request may be sent in accordance with a communications protocol. Accordingly, the contents and timing of the request may be specified by the communications protocol.

Method 900 may proceed to operation 904 during which a CTE period of a transmission protocol may begin. As noted above, such a period may be a designated portion of a transmission and reception of a data packet which may be a Bluetooth Low Energy data packet. Thus, according to various embodiments, a Bluetooth Low Energy data packet may be transmitted to initiate the antenna diversity request described above with reference to operation 902, and a CTE period, in which alternating antennas are alternated/cycled to transmit a continuous tone from the first device, may already have begun, or may subsequently begin during which one or more measurements may be made at the second device.

Accordingly, method 900 may proceed to operation 906 during which a signal measurement may be made in the second device for each antenna used in the first device during the CTE period. In various embodiments, such signal measurements may be implemented in addition to AoD operations and calculations. Accordingly, the first wireless communications device may cycle through its antennas and transmit a continuous tone signal or test data for each antenna during the CTE period. The second wireless communications device may receive the data from each antenna at its own antenna, and may measure a signal strength and/or quality for each of the first device antennas. As previously discussed, additional data may be captured as well for each measurement, such as a communications link identifier, a frequency channel identifier, a time stamp, as well as antenna position data.

Method 900 may proceed to operation 908 during which the signal measurements may be sorted. As noted above, the signal measurements may be indexed based on channel link identifiers and frequency channel identifiers, and may be sorted based on the signal measurements. The sorted results may be stored as antenna diversity data. In various embodiments, the sorted results may be stored at the second wireless communications device.

Method 900 may proceed to operation 910 during which a best antenna may be identified. Accordingly, an antenna with a best signal measurement, such as a greatest signal strength or signal quality, may be identified based on the sorted results. As discussed above with reference to FIG. 7, additional data associated with the antennas, such as position data and time data, may also be retrieved and used to identify the best antenna.

Method 900 may proceed to operation 912 during which a feedback path may be used to return a best result that includes an identification of the best antenna. In various embodiments, the feedback path is a feedback return channel between the second wireless communications device and the first wireless communications device, and such a feedback return channel may be defined by a communications protocol. Accordingly, the second wireless communications device may return a result to the first wireless communications device that identifies a best antenna.

Method 900 may proceed to operation 914 during which the identified best antenna may be used as a transmit/receive antenna. Accordingly, the first wireless communications device may use the identified best antenna as a transmit/receive antenna to transmit/receive a next data packet or frame to/from the second wireless communications device. In this way, a best transmit/receive antenna may be identified and used for the communications link and frequency channel used by the first and second wireless communications devices.

Figure 10:
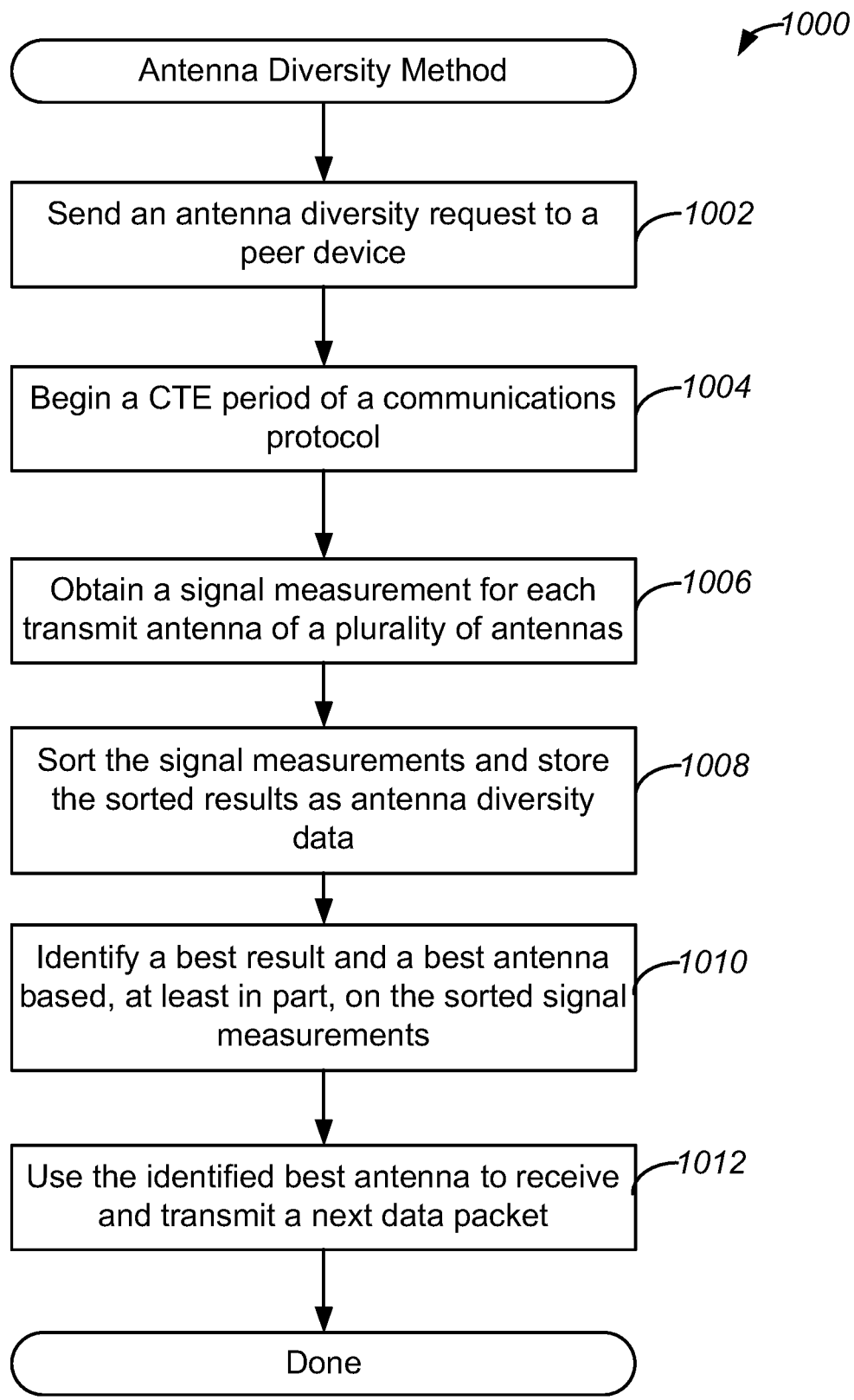
FIG. 10 illustrates a further example of a method for an antenna diversity technique, implemented in accordance with various embodiments.

FIG. 10 illustrates a further example of a method for an antenna diversity technique, implemented in accordance with various embodiments. As noted above, devices disclosed herein may be configured to implement methods where a first wireless communications device used to transmit/receive data has multiple antennas, a second wireless communications device receiving/transmitting the data has a single antenna, and antenna diversity techniques disclosed herein are used to identify and select a best transmit/receive antenna. As disclosed below, a feedback return channel is not utilized.

Accordingly, method 1000 may commence with operation 1002 during which an antenna diversity request may be sent to a peer device. As noted above, a first wireless communications device may send an antenna diversity request to a peer device, such as a second wireless communications device. In various embodiments, the antenna diversity request is configured to ready the second wireless communications device to implement at least some of the antenna diversity operations described below, and synchronize the implementation of such operations. As will be discussed in greater detail below, the antenna diversity request may specifically request the peer device to send AoA supplemental data or CTE data in a reverse (uplink) direction.

Method 1000 may proceed to operation 1004 during which a CTE period of a transmission protocol may begin. As noted above, such a period may be a designated portion of a transmission and reception of a data packet which may be a Bluetooth Low Energy data packet. Thus, according to various embodiments, a Bluetooth Low Energy data packet may be transmitted to initiate the antenna diversity request described above with reference to operation 1002, and a CTE period may subsequently begin during which one or more measurements may be made.

Method 1000 may proceed to operation 1006 during which a signal measurement may be made for each antenna. Thus, in accordance with the request described above, the second wireless communications device may transmit test or CTE sample data to the first wireless communications device, and the first wireless communications device may cycle through its antennas and receive the CTE signal or test data at each antenna. The first wireless communications device may measure a signal strength and/or quality for each of the antennas. As previously discussed, additional data may be captured as well for each measurement, such as a communications link identifier, a frequency channel identifier, a time stamp, as well as antenna position data.

Method 1000 may proceed to operation 1008 during which the signal measurements may be sorted. As noted above, the signal measurements may be indexed based on channel link identifiers and frequency channel identifiers, and may be sorted based on the signal measurements. The sorted results may be stored as antenna diversity data. In various embodiments, the sorted results may be stored at the first wireless communications device.

Method 1000 may proceed to operation 1010 during which a best antenna may be identified. Accordingly, an antenna with a best signal measurement, such as a greatest signal strength or signal quality, may be identified based on the sorted results. As discussed above with reference to FIG. 7, additional data associated with the antennas, such as position data and time data, may also be retrieved and used to identify the best antenna.

Method 1000 may proceed to operation 1012 during which the identified best antenna may be used as a transmit/receive antenna. Accordingly, the first wireless communications device may use the identified best antenna as a transmit/receive antenna to transmit/receive a next data packet or frame to/from the second wireless communications device. In this way, a best transmit/receive antenna may be identified and used for the communications link and frequency channel used by the first and second wireless communications devices.

Figure 11:
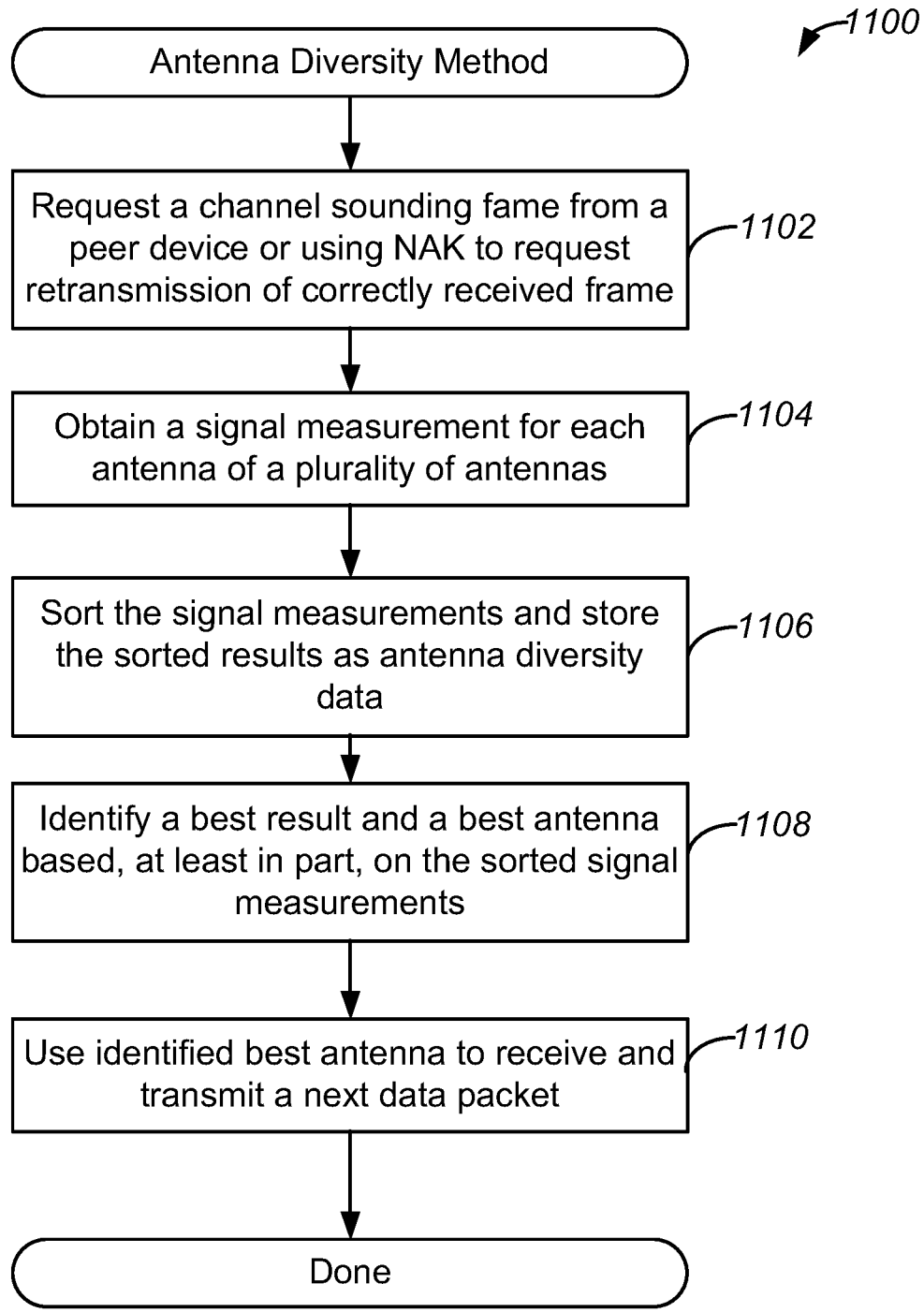
FIG. 11 illustrates another example of a method for an antenna diversity technique, implemented in accordance with various embodiments.

FIG. 11 illustrates another example of a method for an antenna diversity technique, implemented in accordance with various embodiments. As previously discussed, devices disclosed herein may be configured to implement antenna diversity techniques that are used to identify and select a best transmit/receive antenna. Furthermore, such techniques may be implemented in a variety of wireless communications modes, such as those utilized by legacy BR/EDR Bluetooth modes.

Accordingly, method 1100 may commence with operation 1102 during which a channel sounding frame may be requested from a peer device. As similarly described above, a first wireless communications device may send the request for a channel sounding frame to a peer device, such as a second wireless communications device. In various embodiments, the request is configured to cause the second wireless communications device to send the frame to the first wireless communications device. In various embodiments, the peer device might not support the transmission of a channel sounding frame. In such situations, the first device can request the peer device to retransmit a known packet frame and use it as channel sounding frame. For example, the first device can use negative acknowledgement (NAK) (or not ACK) message after a packet frame is received correctly (e.g., passed its CRC check) to make the peer device act as though the previously transmitted frame needs retransmission.

Method 1100 may proceed to operation 1104 during which a signal measurement may be made in channel sounding frame for each antenna. As discussed above, such signal measurements may be measurements of a signal strength and/or quality for each of the antennas. As previously discussed, additional data may be captured as well for each measurement, such as a communications link identifier, a frequency channel identifier, a time stamp, as well as antenna position data.

Method 1100 may proceed to operation 1106 during which the signal measurements may be sorted. As noted above, the signal measurements may be indexed based on channel link identifiers and frequency channel identifiers, and may be sorted based on the signal measurements. The sorted results may be stored as antenna diversity data. In various embodiments, the sorted results may be stored at the first wireless communications device.

Method 1100 may proceed to operation 1108 during which a best antenna may be identified. Accordingly, an antenna with a best signal measurement, such as a greatest signal strength or signal quality, may be identified based on the sorted results. As previously discussed, additional data associated with the antennas, such as position data and time data, may also be retrieved and used to identify the best antenna.

Method 1100 may proceed to operation 1110 during which the identified best antenna may be used as a receive and transmit antenna. Accordingly, the first wireless communications device may use the identified best antenna as a receive and transmit antenna to receive and transmit a next data packet or frame from and to the second wireless communications device. In this way, a best transmit antenna may be identified and used for the communications link and frequency channel used by the first and second wireless communications devices.

Figure 12:
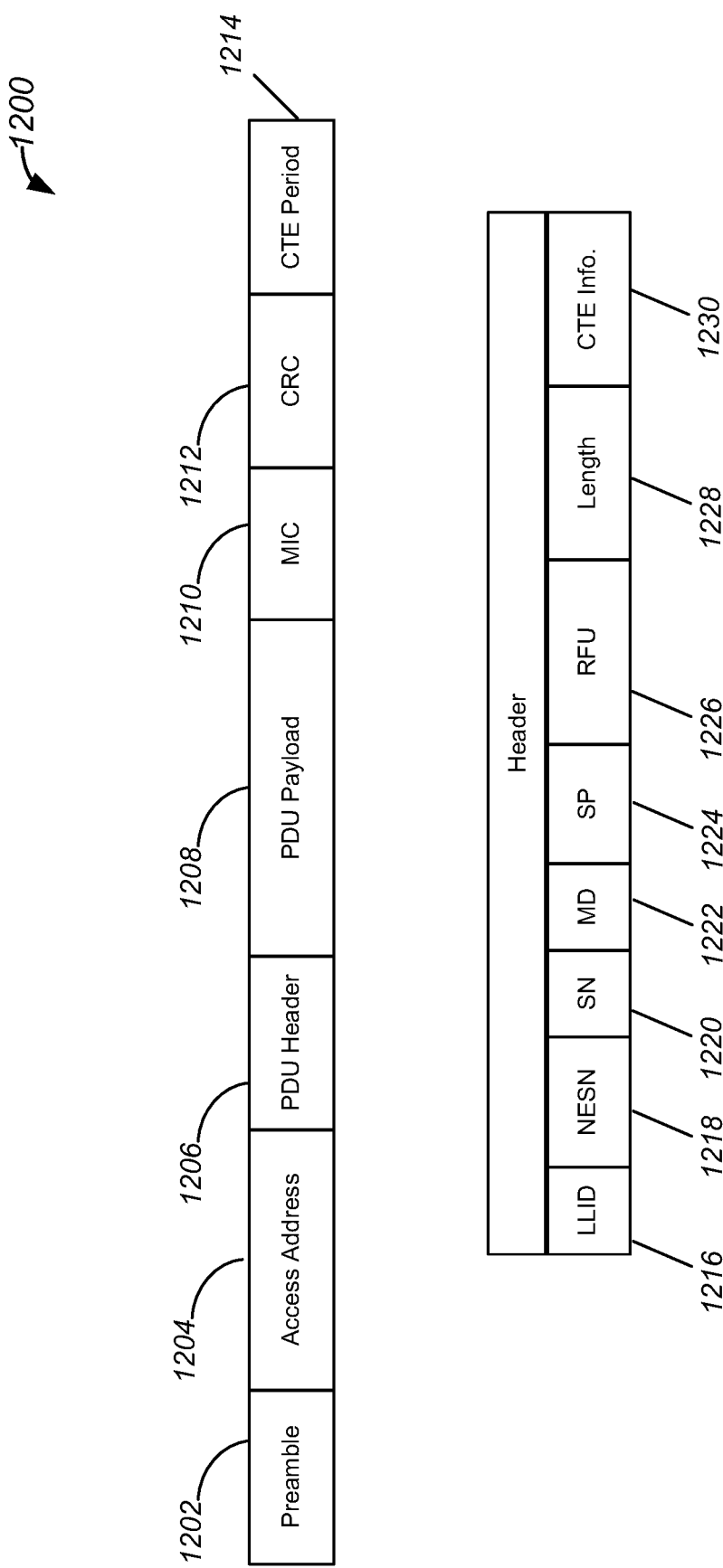
FIG. 12 illustrates an example of a data packet, configured in accordance with various embodiments.

FIG. 12 illustrates an example of a data packet, configured in accordance with various embodiments. In various embodiments, a data packet as shown in FIG. 12, such as data packet 1200, may be a Bluetooth or BLE data packet. Accordingly, data packet 1200, may have preamble 1202, access address, 1204, as well as components of a protocol data unit (PDU) such as PDU header 1206 and PDU payload 1208. Data packet 1200 may also include message integrity check (MIC 1210, as well as cyclic redundancy check (CRC) 1212. In various embodiments, data packet 1200 further includes CTE portion 1214, also referred to herein as a supplemental portion. As discussed above, the antenna diversity techniques disclosed herein may be implemented during this period. Also shown in FIG. 12 is additional detail of the packet header which may include logical link identifier (LLID) 1216, Next Expected Sequence Number (NESN) 1218, sequence number (SN) 1220, more data (MD) 1222, CTE info Present (CP) or also referred to as Supplemental Present (SP) bit 1224, reserved for future use (RFU) 1226, length identifier 1228, and CTE information or also referred to as supplemental information 1230.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A first wireless communications device comprising:
a plurality of antennas; and
a processor configured to wirelessly communicate with a second wireless communications device using a first antenna of the plurality of antennas, wherein the processor is configured to select the first antenna from the plurality of antennas based on comparing first antenna data associated with the first antenna with second antenna data associated with a second antenna, of the plurality of antennas, each of the first and second antenna data comprising, a signal measurement and an identifier that identifies a connection between the first and second wireless communication devices, and the comparing comprising determining a signal measurement of the first antenna is greater than a signal measurement of the second antenna for an identified connection with the second wireless communications device.

2. The first wireless communications device of claim 1, wherein the processor is further configured to calculate location data associated with the first antenna using the first antenna.

3. The first wireless communications device of claim 1, wherein each of the first and second antenna data further include a channel identifier that identifies a frequency band used in the connection between the first and second wireless communication devices.

4. The first wireless communications device of claim 1, wherein each signal measurement is associated with a continuous tone extension (CTE) portion of a Bluetooth packet.

5. The first wireless communications device of claim 1, wherein each signal measurement is used to determine a signal strength or signal quality between each antenna of the plurality of antennas and the second wireless communications device.

6. The first wireless communications device of claim 1, wherein the first antenna is used to transmit a Bluetooth packet.

7. The first wireless communications device of claim 1, wherein the processor is further configured to communicate with a third wireless communications device via a third antenna of the plurality of antennas, wherein the processor is configured to select the third antenna based on a signal measurement associated with a connection between the first and third wireless communications devices.

8. The first wireless communications device of claim 7, wherein the processor is configured to determine a signal strength or signal quality between each antenna of the plurality of antennas and the third wireless communications device, and select the third antenna based on the signal strength or signal quality associated with the third antenna.

9. A first wireless communications device comprising:
a plurality of antennas; and
a processor configured to wirelessly communicate with a second wireless communications device using a first antenna of the plurality of antennas, wherein the processor is configured to select the first antenna from the plurality of antennas based on comparing first antenna data associated with the first antenna with second antenna data associated with a second antenna, of the plurality of antennas, each of the first and second antenna data comprising, a signal measurement associated with the first antenna and the second antenna, and a channel identifier that identifies a frequency band used in a connection between the first and second wireless communication devices, and the comparing comprising determining a signal measurement of the first antenna is greater than a signal measurement of the second antenna for an identified connection with the second wireless communications device.

10. The first wireless communications device of claim 9, wherein each signal measurement is associated with a continuous tone extension (CTE) portion of a Bluetooth packets.

11. The first wireless communications device of claim 9, wherein each of the first and second antenna data further includes an identifier configured to identify the connection between the first wireless communications device and the second wireless communication device.

12. The first wireless communications device of claim 9, wherein the processor is further configured to calculate location data associated with the first antenna using the first antenna.

13. The first wireless communications device of claim 9, wherein the processor is disposed on a monolithic integrated circuit chip.

14. The first wireless communications device of claim 9, wherein the processor is further configured to communicate with a third wireless communications device via at least a third antenna of the plurality of antennas, wherein the processor is configured to select the third antenna based on a signal measurement associated with a connection between the first wireless communications device and the third wireless communications device.

15. The first wireless communications device of claim 14, wherein the processor is configured to determine a signal strength or a signal quality between each antenna of the plurality of antennas and the third wireless communications device, and select the third antenna based on the signal strength or signal quality associated with the third antenna.

16. A method of operating a wireless device, comprising:
receiving a first plurality of signals via each of a plurality of antennas at a first wireless communications device;
determining, using a processor, a signal measurement for each of the plurality of antennas, the signal measurement comprising a signal strength or signal quality measurement;
selecting, using the processor, a first antenna for communication with a second wireless communications device based on comparing first antenna data associated with a first antenna, of the plurality of antennas, with second antenna data associated with a second antenna, of the plurality of antennas, the first and second antenna data each comprising the signal measurement for first and second antennas and a link identifier that identifies a connection between the first and second wireless communication devices, and the comparing comprising determining a signal measurement of the first antenna is greater than a signal measurement of the second antenna for an identified connection with the second wireless communications device.

17. The method of claim 16, wherein the determining the signal measurement for each of the plurality of antennas further comprises using a continuous tone extension (CTE) of a Bluetooth data packet.

18. The method of claim 16, wherein the determining the signal measurement for each of the plurality of antennas further comprises determining a signal-to-interference-plus-noise (SINR) ratio for each of the plurality of antennas.

19. The method of claim 16, wherein the first and second antenna data further comprise a first frequency identifier that identifies a frequency band used in the connection between the first and second wireless communication devices.

20. The method of claim 16 further comprising:
receiving a second plurality of signals via each of the plurality of antennas at the first wireless communications device;
determining, using the processor, another signal measurement for each of the plurality of antennas, the other signal measurement comprising a signal strength or signal quality measurement; and
selecting, using the processor, a third antenna based on the signal measurement associated with the third antenna.

* * * * *